June 18, 1940.  E. J. BARNETT  2,205,129
DEVICE FOR DISPENSING MEASURED QUANTITIES OF DIVIDED SOLID MATERIAL
Filed July 24, 1937  3 Sheets-Sheet 1
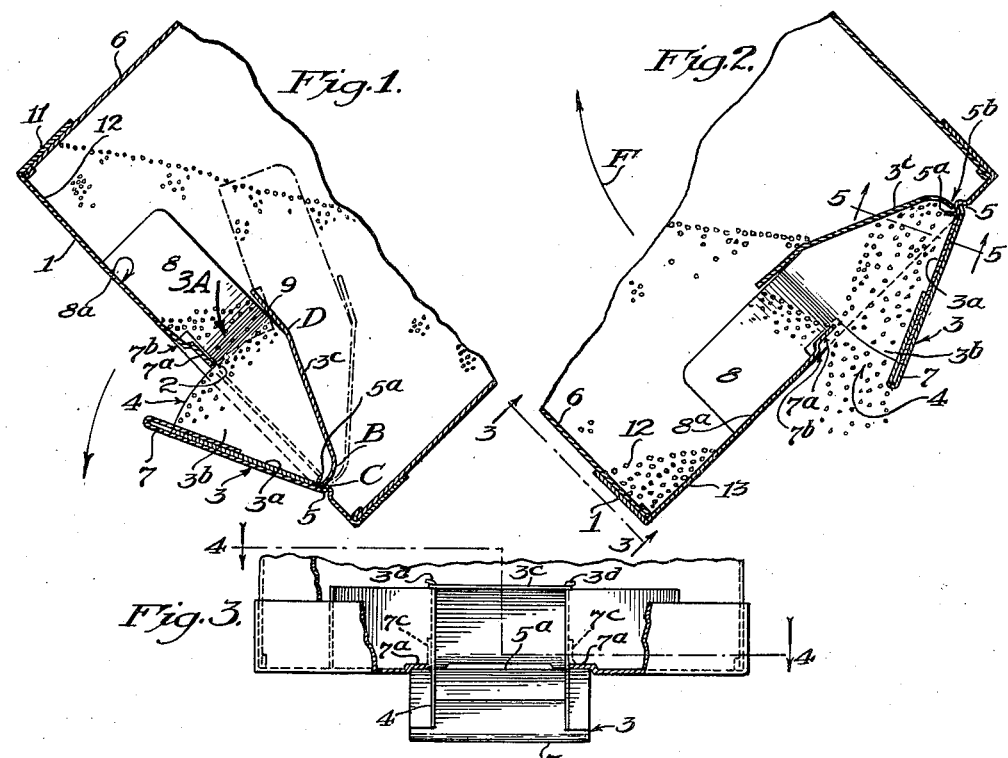
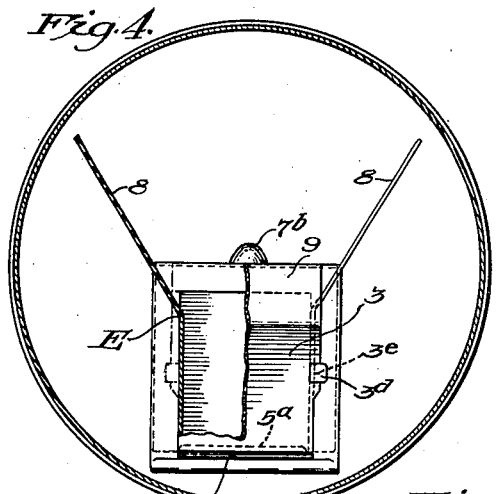
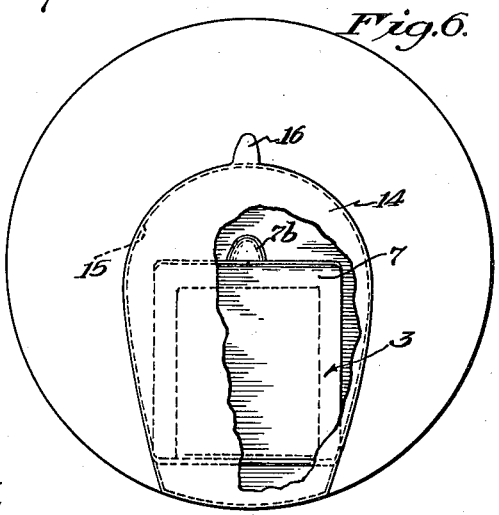
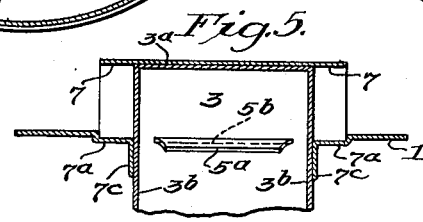
INVENTOR.
Edward J. Barnett,
BY
ATTORNEYS.

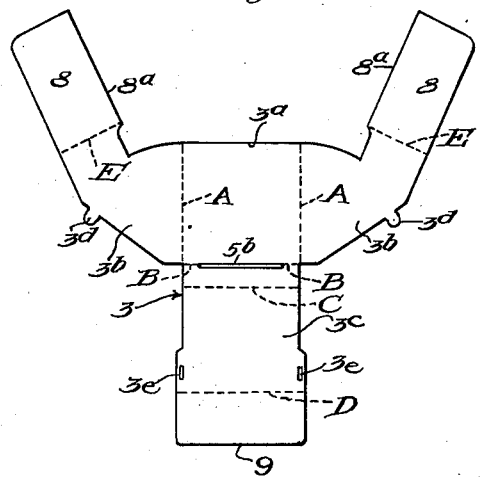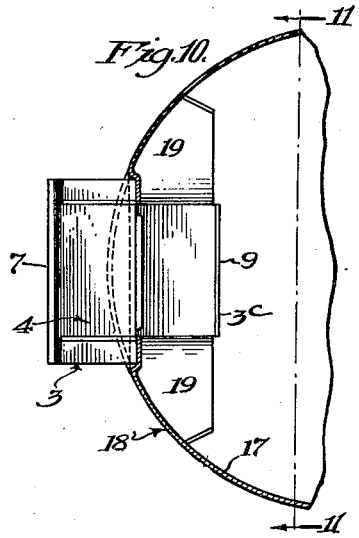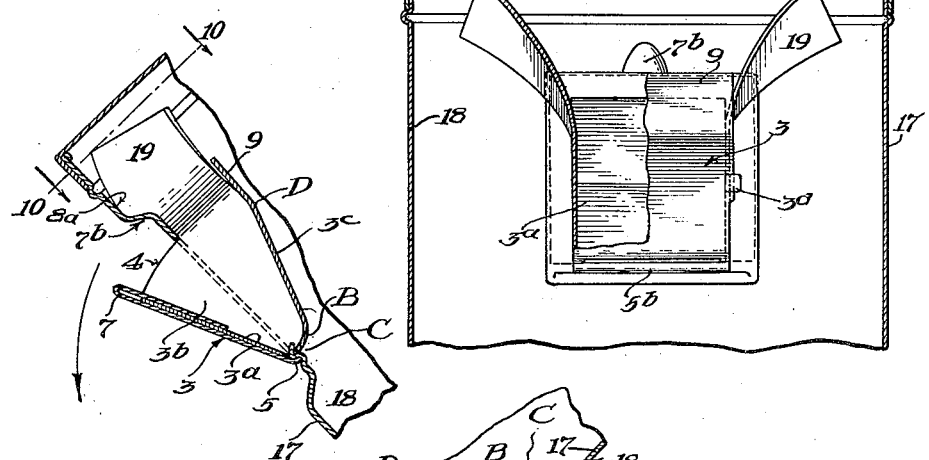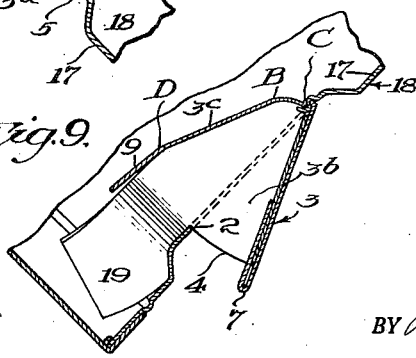

June 18, 1940.    E. J. BARNETT    2,205,129
DEVICE FOR DISPENSING MEASURED QUANTITIES OF DIVIDED SOLID MATERIAL
Filed July 24, 1937    3 Sheets-Sheet 3
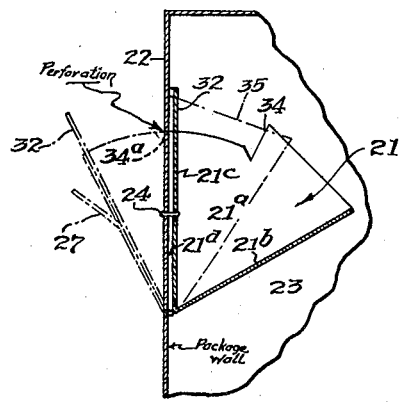
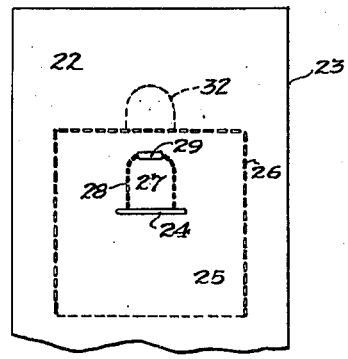
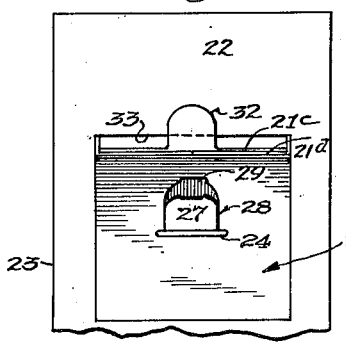
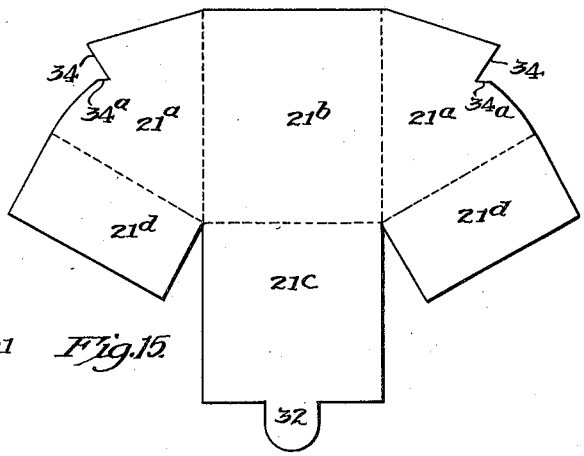
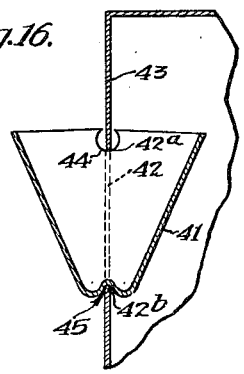
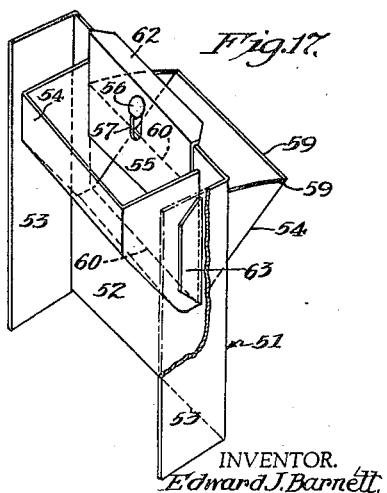
INVENTOR.
Edward J. Barnett
BY
ATTORNEYS Patented June 18, 1940

2,205,129

UNITED STATES PATENT OFFICE 2,205,129

DEVICE FOR DISPENSING MEASURED QUANTITIES OF DIVIDED SOLID MATERIAL

Edward J. Barnett, Compton, Calif., assignor of one-half to Lloyd L. Sissell, Los Angeles, Calif.

Application July 24, 1937, Serial No. 155,491

3 Claims. (Cl. 221—98)

This invention relates to devices for dispensing a measured quantity of divided solid material from a container, and pertains particularly to a device which may be incorporated in or associated with a container or package structure to dispense successive measured quantities of a divided solid material from such container. One of the particular objects of the invention is to provide a device which may be employed to dispense successive equal quantities of a divided solid material from a container, by inverting such container and rotating the same between two positions which, respectively, serve to fill the dispensing device from the container and to discharge the material from the dispensing device.

Another object of the invention is to provide a device of the character described which will operate effectively when the container is filled and will dispense the material from the container in given measured quantities and dispense the remaining portion of less than the given quantity upon the last operation of the device, to substantially empty the container.

A further object of the invention is to provide a device of the character described which may be readily fabricated at a low cost for materials and labor. A further object of the invention, in at least certain embodiments thereof, is to provide a device which may be utilized to effect a closure of the container with which it is associated when such container is placed in the normal position for storage, whereby contamination of the material within the package by exposure to atmospheric air or other agency is substantially prevented.

The device of the present invention may comprise, essentially, a wall member forming a part of a container or adapted to be associated with a container in the role of a closure member or the like, provided with an opening within which a measuring hopper element is disposed, such hopper member being adapted, in the preferred embodiments of the invention, for pivotal movement about an axis adjacent one edge of said opening between one position substantially wholly to one side of the wall member (corresponding to the interior of the associated container) and another position partly at the other side of said wall member (corresponding to the exterior of the container) whereby, when said wall member is in its normal position with respect to a container, the hopper member may be moved from a position substantially wholly within the container to a position projecting therefrom.

The above-described movement of the hopper member between the interior and exterior positions is provided for the purpose of closing the container when not in use and for making the dispensing device available for use. During the actual use of the device in dispensing, no movement of the hopper member relative to the container is necessary, the outer position of the hopper being such that the inner portion thereof is disposed interiorly of the container in position to receive material therefrom when the container is raised to an inverted position and then lowered, and the outer portion thereof is disposed outwardly of the container in position to function as a dispensing spout for the said received material when said container is again raised toward said inverted position, and cooperating holding means are preferably provided for causing the hopper to persist in one or the other of said positions until forcibly moved to the other position by manual means. The device is also preferably provided with suitable guide members located interiorly of the container in position to direct material toward and into the hopper member in the portion of the operation during which the hopper member is filled with a quantity of material which is to be subsequently dispensed.

A further object of the invention is to provide a device of the character described which will function to dispense measured quantities of a divided material upon movement of the associated container between the respective positions aforesaid, and which may alternatively be employed to provide a continuous dispensing of divided material from the associated container when held in a position intermediate said positions.

Other objects of the invention will be hereinafter brought out in connection with the description thereof or will be apparent from such description. The accompanying drawings illustrate certain preferred embodiments of the invention and referring thereto:

Fig. 1 is a partly broken-away sectional view of one form of the device attached to a container, showing the device in filling position;

Fig. 2 is a corresponding view of the same form of device showing the same in dispensing position;

Fig. 3 is a side elevation thereof taken on line 3—3 in Fig. 2, with portions broken away;

Fig. 4 is a transverse sectional view thereof taken on line 4—4 in Fig. 3, inverted so that the dispensing member is disposed at the lower side, for the purpose of clarity;

Fig. 5 is a sectional view thereof taken on line 5—5 in Fig. 2;

Fig. 6 is an end view of a container provided with a device according to the present invention, showing an auxiliary protecting element which is removably disposed over the dispensing device to provide a hermetic seal for the container prior to use, with the protecting element partly broken away;

Fig. 7 is a blank which may be used for fabricating the hopper and guide members from sheet material;

Fig. 8 is a view corresponding generally to Fig. 1, in which a dispensing hopper is shown mounted in a curved surface such as the side of a coffee can;

Fig. 9 is a corresponding view of the same form of the device showing the same in dispensing position;

Fig. 10 is a view taken on line 10—10 in Fig. 8 and corresponds generally to Fig. 3;

Fig. 11 is a view taken on line 11—11 in Fig. 10 with a portion of the hopper member broken away and corresponds generally to Fig. 4;

Fig. 12 is a fragmentary vertical section of another modification of the invention;

Fig. 13 is a fragmentary face view thereof;

Fig. 14 is a view corresponding to Fig. 13, showing the dispensing hopper in open position;

Fig. 15 is a plan view of a blank which may be used in fabricating the hopper member employed in the form of invention shown in Figs. 12–14;

Fig. 16 is a view corresponding to Fig. 12, of a further modified form of the invention; and Fig. 17 is a perspective view of a form of the invention adapted for removable attachment to a container.

Referring to Figs. 1 to 7 of the drawings, the device of the present invention may comprise a container wall member 1 provided with an opening 2 located preferably adjacent one edge of the wall 1, within which is mounted a hopper member 3 which preferably comprises a wedge-shaped container member having upwardly diverging front and rear walls and an open upper edge or end 4, and pivotally secured to the wall member 1 along the apex end as at 5. The pivotal axis of the hopper member 3, as defined for example by hinge tab 5a extending through a slot 5b in the hopper member 3, preferably extends substantially parallel to and closely adjacent the plane of the wall member 1. The hopper 3 is preferably movable between a closed position (as shown in dot-dash lines in Fig. 1) in which substantially the entire hopper is disposed at one side of the wall 1 (the side which would face inwardly of the container 6 in use) to an open or dispensing position (shown in full lines in Figs. 1 and 2) in which the outer portion of the open end 4 of the hopper is directed outwardly from the opening 2 at the other or outer side of the wall and the inner portion is within the container. In this position the interior portion of the hopper is in position to receive material from the interior of the container when the whole unit is raised to an inverted position and then lowered or returned to normal position, and the exterior portion of the hopper is adapted to serve as a dispensing spout in the succeeding movement of the unit toward inverted position. Suitable guiding members for guiding material into the hopper 3 are preferably also provided at the container side of the wall 1, such as are shown at 8 in this form of the device. These guide members may conveniently be formed as extensions of the side walls 3b of the hopper 3, and serve the additional function of limiting the outward movement of the hopper 3 through the opening 2, as by engagement of the forward edges 8a thereof with the wall 1 as shown in Figs. 1 and 2.

The outer or forward wall 3a of the hopper 3 is preferably extended beyond the limits of the hole or opening 2 as at 7 to limit the inward movement of said hopper, and in order to improve the appearance of the device and to provide a more effective seal, a portion 7a of the wall member 1 is indented to receive the portion 7 of the hopper 3. The wall member 1 is preferably indented as at 7b to provide access for the fingernail under the upper edge of the portion 7 of the hopper 3 so that the hopper 3 may be readily engaged for movement to open position. I preferably provide positioning means for holding the hopper 3 in either the open or the closed position. Such means may comprise spring members 7c in frictional engagement with the side wall portions 3b of the hopper 3. The members 7c are preferably formed integrally with the wall member 1 and if the opening 2 is formed by a punching operation, for example, the spring members 7c may be formed on the sides of the opening 2 in the same operation. It will be appreciated that in some instances the material from which the wall member 1 is fabricated will not be suitable for spring members 7c and that it will be necessary to utilize a suitable spring material for the springs 7c and to secure the same to the wall member 1 by any suitable means.

Referring particularly to Fig. 7, I have shown a suitable blank which may be used to fabricate the hopper 3 from sheet material. The hopper 3 may be formed by bending the portions 3b upwardly about the dotted line A and the front wall portion 3a and the back wall portion 3c may now be formed by bending such portions toward one another about the dotted lines B, C and D. Tabs 3d formed on the side wall members 3b may then be placed through openings 3e provided in the back wall member 3c. The tabs 3d are then bent over to secure the hopper in the assembled relation. The end portion 9 of the inner wall member 3c and the guide members 8 may be bent along the dotted lines D and E respectively, as shown more fully in Figs. 1 to 4, for reasons which will be brought out subsequently.

Fig. 6 illustrates a face view of the upper end of the container, showing the device provided with a hermetic sealing means over the dispensing device so that the contained food or other commodity may be kept in perfect condition until the package is opened. Such hermetic sealing means may comprise a removable cover member 14 such as a deformable metallic strip or sheet secured to the lid member 1 in any suitable manner, as by soldering or the like as shown by the dotted line 15 along the edge portions of the member 14, a suitable tab member being preferably provided as at 16 for engagement by a key member according to means well known to the art.

The form of the device shown in Figs. 1 to 6 is shown formed as a cap member 11 adapted to be placed in position over the open end of a container 6 in the role of a removable closure member for such container, although it will be appreciated that the structure may be made integral if desired, either in the top wall as shown, or in the side wall as shown in connection with Figs. 8–11 hereinafter described.

It will be understood that the dispensing device is ordinarily disposed in the inward position shown in dot-dash lines in Fig. 1, so that the container is closed to as great a degree as possible, and when it is desired to dispense some material from the container it is merely necessary to insert the finger or thumb nail under the edge of the front portion 7 of the hopper, at the position of the recess 7b, and move the hopper forwardly about the pivot provided by the hinge 5a—5b into the position shown in full lines in Figs. 1 to 4. The cooperating engaging means which are provided at 7c, for example, (cooperating with the side walls of the hopper) serve to cause the hopper to persist in either position to which it may be moved, and no movement of the hopper with respect to the container is required in the actual dispensing operation of the device.

The device may be used for dispensing such divided solid materials as granulated soap, pulverized or ground coffee, salt, sugar, or any comparable material, by inverting the container 6 to a position such as that shown in Fig. 1 in which the contained material will fall or be thrown against the wall 1 as indicated at 12. It will be appreciated that in some instances when the container is nearly empty it may be necessary to practically invert the container 6 so that the closure member 1 is in a horizontal position in order to place the contained material in a position to be moved into the hopper 3. With the hopper 3 in the open position as shown in Fig. 1 the contained material will tend to enter the hopper by gravity and will be guided into the material-receiving portion 3A of the hopper by the guide members 8. The hopper will fill practically instantaneously and a measured quantity of material may be discharged therefrom by rotating the container 6 about an axis parallel to the pivot axis 5 to a position such as that shown at Fig. 2, at which position a measured quantity of the container material is discharged through the opening 4. The hopper 3 may again be filled by rotating the container 6 in a clockwise direction, as indicated by the arrow F, back to the position shown in Fig. 1. Thus it may be seen that while the container is in the position shown in Fig. 2 the contained material 12 will tend to gravitate toward the lowest portion of the container indicated at 13 and as the container is rotated in the direction of the arrow F the contained material will tend to slide along the surface of the closure member 1 and be guided into the hopper 3 by the guide members 8. In this embodiment of my device I prefer to have the guide members 8 so that the edges 8a thereof are in close engagement with the closure member 1 in order to insure the complete removal of all the contained material from within the can or container into the hopper 3 and in order to prevent the escape of any of the contained material between the edges 8a of the guide members 8 and the surface of the closure member 1.

It will be appreciated that the spring means 7c or other comparable means for frictionally engaging the side wall members 3b may be omitted without departing from the spirit of this invention, since the device will ordinarily tend to persist in the open or closed position if due care is taken in fabricating the hopper 3 so that it will fit snugly into the opening 2 in the container 6.

The form of the invention shown in Figs. 8 to 11 conforms substantially to the form shown in Figs. 1 to 7, the dispensing device being adapted to installation in the side wall 17 of a cylindrical container 18, the construction of the hopper member being substantially identical with the hopper member shown in the first-described form of the invention. For this reason, identical reference numerals are employed for the identification of the respective parts, it being noted that the guide members 19 are altered from the members 8 in being curved outwardly along their outer surfaces to conform to the cylindrical contour of the container side wall, instead of being extended in a straight line as in the case of the members 8.

The form of the invention shown in Figs. 12 to 14 is adapted to be incorporated in a package or container as a permanent unit, and is particularly adaptable to cardboard box constructions. Fig. 15 shows a blank which may be folded along the dotted lines to form a hopper member 21, the portions 21a constituting the side wall portions of the hopper, the portion 21b constituting the rear wall portion, and the portion 21c constituting the front wall. The portions 21d are folded over the outside of the front wall portion 21c, and intersecured thereto by means of a staple or the like. The hopper 21 is conveniently secured to the side wall 22 of a carton or package 23 through the agency of the aforesaid staple, as at 24, and the package wall is perforated to provide a substantially rectangular scored area 25, at positions along the side and top outline of the hopper 21, as indicated at 26. If desired, the outer surfaces of the portions 21d may be glued or cemented to the inner surface of the package wall 22, and the inner surface of the portions 21d may be glued to the outer surface of the portion 21c, as will be apparent to one skilled in the art, in order to provide a more durable construction.

Suitable means are preferably provided to facilitate the initial opening movement of the hopper into dispensing position (shown in Fig. 14), and for this purpose I may provide a tab member 27 in the face of the wall 22, having a scored area 28 defined by the perforated outline 28a provided with an aperture 29, so that the fingernail may be inserted at 29 and the portion 27 pulled outwardly away from the plane of the package wall 22, the staple 24 being relied upon to prevent the tab from tearing out from the wall 22. The outward position of the tab 27 is shown in Figs. 12 and 14. It will be appreciated that where the portions 21d are cemented to the inner surface of the wall 22, it will be desirable to omit the cementing agent over the area of the tab 27, so that the same may be readily pulled from the plane of the container wall.

For the purpose of preventing the hopper 21 from being pushed wholly inside the aperture 31 in the box wall 22 which results when the perforations 26 are cut through, and to facilitate the convenient use of the device, I preferably provide a tab member 32 on the portion 21c of the hopper, in a position extending upwardly from the upper edge of said portion. This tab is disposed interiorly of the container in the position shown in Fig. 12 until the first opening movement of the hopper is produced, during which the tab is deformed by the opening movement and caused to pass under the upper edge 33 of the opening in the side wall of the container which is provided by the perforations 26. The side walls 21a of the hopper 21 are preferably provided with upwardly projecting extensions 34 adapted to engage the inner surface of the package wall 22 as shown in dot-dash lines in Fig. 12, to limit the outward movement of the hopper, and said extensions 34 are preferably disposed intermediate the length of the side walls so that when the hopper is in the outward position shown in dot-dash lines in Fig. 12 the hopper is disposed partly inside the package and partly outside. The side walls 21a are preferably made of such height as to rub against the upper edge 33 of the opening, and small notches 34a are preferably provided in the upper edges of the hide walls to cooperate with the projections 34 to cause the hopper to persist in the outward position, said notches being engaged by the aforesaid edge 33.

The portion within the package, designated at 35, constitutes a material receiving portion, corresponding in function to the portion 3A described in connection with the form of device shown in Fig. 1. The operation of the device shown in Figs. 12 through 15 is entirely comparable to that of the forms above described, the extensions 34 serving to some extent in a role comparable to the guide members 8.

The form of device shown in Fig. 16 may comprise a wedge-shaped open-topped hopper 41 adapted to be crowded into a rectangular opening 42 in the side wall of a package 43, suitable recesses or notches being provided as at 44 in the side walls of the hopper to receive the container side wall at the upper edge 42a of the opening 42, and a suitable groove or recess being provided along the lower edge of the hopper as at 45 to engage the container side wall at the lower edge 42b of the opening 42. The recesses 44 and 45 thus cooperate to position the hopper within the opening 42, while the hopper may be readily removed from the container for placement upon a fresh container by the simple expedient of pulling the same outwardly at the bottom to free the lower recess 45 from the edge of the container wall and then withdrawing the hopper from the opening. The new container may be provided with a removable portion, perforated to the outline of the opening 42, if desired, so that such container may readily be placed in condition for receiving the hopper. The degree to which the upper edge 42a of the opening 42 is allowed to extend below the upper edge of the hopper 41 will control the quantity of solid material received by the hopper in the dispensing movement of the container.

The form of device shown in Fig. 17 is adapted to be used on a standard carton or container, and may be placed in frictional engagement with such a container for use and removed therefrom when the container is emptied. The device comprises, essentially, an outer support member 51 provided with a face portion 52 and side wall portions 53, said support member being adapted to lie along the end face of a package or carton, with the side wall portions in frictional engagement with the side walls of the container. A hopper member is provided as at 54, which may be pivotally mounted on the support member in any suitable manner within an opening 60, as for example, through the agency of a hinge tab and slot construction of the type shown at 5a and 5b in Figs. 1 to 5 in connection with the first-described form of the invention, said hopper being adapted to extend through a suitable opening in the wall of the container, which opening may correspond roughly in shape and size to the opening 60. The hopper 54 may conform in general shape to the hopper shown at 21 in Fig. 12. This particular form of the device may conveniently be provided with a gauging partition 55, slidably mounted upon the face portion 52 of the member 51, as through the agency of a pin 56 and slot 57, and adapted for upward and downward adjustable movement, whereby the lower edge 58 of the partition 55 may be disposed in any desired position relative to the upper edge 59 of the front wall of the hopper 54. The function of the partition 55 is that of controlling the degree to which the hopper will fill when the assembly is in a position corresponding to that shown in Figs. 1 and 8, the lower the partition is disposed with respect to the edge 59, the less material being fed into the hopper for the subsequent dispensing movement of the device. A suitable lip or flange portion may be provided for the partition 55, as at 62, extending exteriorly thereof for ready manual engagement by the user. Suitable cooperating positioning means may be provided for causing the hopper 54 to persist in its outward position, such as spring flanges 63 disposed at the sides of said hopper, comparable to the members 7c shown in connection with the first-described form of the device.

In each of the above forms of invention, accurate dispensing of measured quantities of material is effected by causing a rather rapid movement of the container between lowered and inverted positions, although comparatively slow movements may be employed if the constructions are modified to provide a greater length to the rearward wall of the hopper. In general, where proportions such as herein delineated are followed in construction of the hopper, the devices may be caused to dispense a continuous stream of material from the container and held in such position that the container wall which carries the dispensing device is substantially horizontal, in which case the material will flow downwardly over the top edge of the rearward wall, thence back past the top edge of the dispensing opening and then outwardly of the hopper. The tendency for material to flow freely when the device is held in this manner is governed jointly by the length of the rearward wall and the extent to which the partition which is formed by the top edge of the dispensing opening extends inwardly of the hopper member, and may readily be established at any desired value.

Other modifications of the device will suggest themselves to those skilled in the art, and I do not choose to be limited to the specific embodiments herein delineated and described, but rather to the scope of the subjoined claims.

I claim:

1. In combination with a container, a dispensing device adapted for receiving and discharging one or more measured quantities of a divided solid material, which comprises: a hopper member provided with upwardly diverging front and rear walls and having an open upper end, said hopper member being pivotally attached to a side wall of said container and movable between a closed position wholly within said container and a dispensing position partly to one side of said side wall; said hopper having a portion disposed interiorly of said container when in said dispensing position, to receive material from said container upon said container being raised to an inverted position and then lowered, and a portion disposed outwardly of said container in position to function as a dispensing spout for the said received material when said container is again raised toward said inverted position; and cooperating positioning means on said container wall and said hopper member to cause said hopper member to persist in said dispensing position during movement of said container into and out of said inverted position.

2. In combination with a container having a wall portion provided with a scored area defined by a line of perforations extending along three sides of a substantially rectangular area and adapted to be deformed away from the plane of said side wall about a line constituting the fourth side of said area, a dispensing device adapted for receiving and discharging one or more measured quantities of divided solid material, which comprises: a wedge-shaped hopper member provided with upwardly diverging front and rear walls and an open upper end, secured to said side wall at the position of said scored area with the end thereof opposite said open upper end lying adjacent said fourth side of said area, said hopper member being movable upon deformation of said scored area to a position at least partly to one side of said wall portion, with a portion of said hopper member disposed interiorly of said container in position to receive material therefrom upon said container being raised to an inverted position and then lowered, and a portion disposed outwardly of said container in position to serve as a spout for dispensing said received material as said container is again raised toward said inverted position and comprising in addition, cooperating positioning means on said container wall portion and said hopper member, to cause said hopper member to persist in said material receiving and dispensing position during movement of said container into and out of said inverted position.

3. In combination with a container having a wall portion provided with a scored area defined by a line of perforations extending along three sides of a substantially rectangular area and adapted to be deformed away from the plane of said side wall about a line constituting the fourth side of said area, a dispensing device adapted for receiving and discharging one or more measured quantities of divided solid material, which comprises: a wedge-shaped hopper member provided with upwardly diverging front and rear walls and an open upper end, secured to said side wall at the position of said scored area with the end thereof opposite said open upper end lying adjacent said fourth side of said area, said hopper member being movable upon deformation of said scored area to a position at least partly to one side of said wall portion, with a portion of said hopper member disposed interiorly of said container in position to receive material therefrom upon said container being raised to an inverted position and then lowered, and a portion disposed outwardly of said container in position to serve as a spout for dispensing said received material as said container is again raised toward said inverted position, said hopper comprising in addition a tab member secured to the front wall thereof and extending upwardly from the upper edge thereof to a position above the upper side of said scored area, said tab member and said front wall of said hopper being disposed within said container prior to deformation of said scored area and movable to a position outwardly of said container side wall at said line of perforations, to position said tab member forwardly of said side wall.

EDWARD J. BARNETT.